United States Patent
Hara et al.

(10) Patent No.: US 7,531,485 B2
(45) Date of Patent: May 12, 2009

(54) METHOD OF PRODUCING A LUBRICANT FOR A MAGNETIC DISK, LUBRICANT FOR A MAGNETIC DISK, MAGNETIC DISK, AND METHOD OF PRODUCING A MAGNETIC DISK

(75) Inventors: Kota Hara, Tokyo (JP); Koichi Shimokawa, Tokyo (JP); Kota Suzuki, Tokyo (JP)

(73) Assignee: Hoya Corporation, Tokyo (JP)

( * ) Notice: Subject to any disclaimer, the term of this patent is extended or adjusted under 35 U.S.C. 154(b) by 631 days.

(21) Appl. No.: 11/234,083

(22) Filed: Sep. 26, 2005

(65) Prior Publication Data

US 2006/0068229 A1 Mar. 30, 2006

(30) Foreign Application Priority Data

Sep. 27, 2004 (JP) .............................. 2004-278892

(51) Int. Cl.
*C10M 175/00* (2006.01)

(52) U.S. Cl. ...................................... 508/111

(58) Field of Classification Search ....................... None
See application file for complete search history.

(56) References Cited

U.S. PATENT DOCUMENTS

| | | | | |
|---|---|---|---|---|
| 4,812,436 A * | 3/1989 | Staal et al. | ................... | 502/407 |
| 5,053,169 A | 10/1991 | Price | | |
| 5,110,509 A * | 5/1992 | Peter et al. | ................... | 554/184 |
| 6,410,103 B1 | 6/2002 | Kasamatsu et al. | | |
| 6,544,893 B2 | 4/2003 | Eto | | |
| 6,911,420 B2 * | 6/2005 | Osawa et al. | ................. | 508/111 |
| 7,199,087 B2 * | 4/2007 | Osawa et al. | ................. | 508/111 |

FOREIGN PATENT DOCUMENTS

| | | |
|---|---|---|
| JP | 62-066417 A | 3/1987 |
| JP | 11-031321 A | 2/1999 |
| JP | 11/224419 A | 8/1999 |

\* cited by examiner

*Primary Examiner*—Holly Rickman
(74) *Attorney, Agent, or Firm*—Sughrue Mion, PLLC

(57) ABSTRACT

On producing a lubricant which is used in making a lubrication layer included in a magnetic disk from the lubricant, a phosphorus-containing compound is removed from a raw-material lubricant including the phosphorus-containing compound to produce the lubricant. The magnetic disk includes a substrate on which at least a magnetic layer, a protection layer, and the lubrication layer formed by the use of the lubricant are successively formed.

12 Claims, 2 Drawing Sheets

US 7,531,485 B2

METHOD OF PRODUCING A LUBRICANT FOR A MAGNETIC DISK, LUBRICANT FOR A MAGNETIC DISK, MAGNETIC DISK, AND METHOD OF PRODUCING A MAGNETIC DISK

This application claims priority to prior Japanese patent application JP 2004-278892, the disclosure of which is incorporated herein by reference.

BACKGROUND OF THE INVENTION

This invention relates to a method of producing a lubricant for a magnetic disk, a lubricant for a magnetic disk, a magnetic disk, and a method of producing a magnetic disk. More particularly, this invention relates to a method of producing a lubricant which provides a magnetic disk suitable for a load unload system and having a lubrication layer capable of suppressing a fly stiction defect or a contamination on a surface of a magnetic head even if the magnetic head has a very narrow flying height of 12 nm or less, a lubricant obtained by the method, a magnetic disk obtained by using the lubricant and having the above-mentioned feature, and a method of producing the magnetic disk.

In a magnetic disk apparatus such as a hard disk drive (HDD), a CSS (Contact Start Stop) system has been used. In the CSS system, when the magnetic disk apparatus is stopped, a magnetic head is kept in contact with a contact-start-stop region (CSS region) formed in an inner peripheral region on a surface of a magnetic disk. In a starting operation, the magnetic head slides on the CSS region in contact therewith to be slightly floated up. Thereafter, a recording or a reproducing operation is carried out on a recording/reproducing region formed outside the CSS region. In a stopping operation, the magnetic head is retreated from the recording/reproducing region to the CSS region and stopped after landing and sliding on the CSS region in contact therewith. The starting operation and the stopping operation in which contact sliding movement occurs will collectively be called a CSS operation.

In a magnetic disk for the CSS system mentioned above, it is necessary to form both the CSS region and the recording/reproducing region on the surface of the magnetic disk. Further, in order to prevent stiction between the magnetic head and the magnetic disk when the magnetic head and the magnetic disk are contacted, it is necessary to provide the surface of the magnetic disk with a texture having a predetermined surface roughness. In order to suppress a damage due to the contact sliding movement between the magnetic head and the magnetic disk during the CSS operation, proposal is made of a magnetic disk medium coated with a perfluoroalkylpolyether lubricant having a structure of $HOCH_2$—$CF_2O$—$(C_2F_4O)_p$—$(CF_2O)_q$—$CH_2OH$ (for example, see Japanese Unexamined Patent Application Publication (JP-A) No. S62-66417). Proposal is also made of a lubricant for a hard magnetic disk, which contains a specific phosphazene compound as a main component (for example, see Japanese Unexamined Patent Application Publication (JP-A) No. H11-224419).

Recently, a magnetic disk apparatus of a load unload system is being introduced instead of the above-mentioned CSS system. Hereinafter, the load unload system may appropriately be called a LUL system. In the LUL system, when the magnetic disk apparatus is stopped, a magnetic head is retreated to a tilting table, called a ramp, which is positioned outside the magnetic disk. In a starting operation, the magnetic head slides from the ramp onto the magnetic disk after start of rotation of the magnetic disk. Thereafter, a recording or reproducing operation is carried out. A series of the above-mentioned operations are collectively called an LUL operation. As compared with the CSS system, the LUL system assures a wide recording/reproducing region on the surface of the magnetic disk and is therefore preferable in view of an increase in information capacity. Further, in the LUL system, the texture required for the CSS system need not be formed on the surface of the magnetic disk so that the surface of the magnetic disk can be extremely flattened and smoothed. Accordingly, the flying height of the magnetic head is significantly reduced so that a recording signal is increased in S/N ratio. Thus, the LUL system is advantageous.

Following the introduction of the LUL system, the flying height of the magnetic head is significantly reduced as mentioned above. Under the circumstances, it is required for the magnetic disk to stably operate even if the magnetic head has a very low flying height of 12 nm or less. However, when the magnetic head flies and runs on the surface of the magnetic disk at such a very low flying height, a fly stiction defect and a head corrosion defect are frequently caused to occur.

The fly stiction defect is a defect that the magnetic head is fluctuated in flying position or flying height during flying and running. The fly stiction defect is accompanied with irregular fluctuation in reproduction output. In the worst case, the magnetic disk is contacted with the magnetic head during flying and running to cause a head crash defect, resulting in breakage of the magnetic disk.

On the other hand, the corrosion defect is a defect that a device portion of the magnetic head is corroded to cause a trouble in the recording or the reproducing operation. Sometimes, the recording or the reproducing operation becomes impossible or a corroded device is expanded to damage the surface of the magnetic disk during flying and running.

Recently, in order to increase a response speed of the magnetic disk apparatus, the rotation speed of the magnetic disk is increased. In a 2.5-inch magnetic disk apparatus as a small-sized magnetic disk apparatus suitable for mobile applications, the rotation speed has been about 4200 rpm in the past. Recently, the magnetic disk is rotated at a high rotation speed of 5400 rpm or more to thereby improve a response characteristic. Such high-speed rotation of the magnetic disk exposes a phenomenon that a centrifugal force following the rotation causes migration of a lubrication layer and, consequently, the thickness of the lubrication layer becomes non-uniform in a plane of the magnetic disk. If the thickness of the lubrication layer is increased at an outer periphery of the magnetic disk, the fly stiction defect or the head crash defect is easily caused to occur during the LUL operation. If the thickness of the lubrication layer is decreased at an inner periphery of the magnetic disk, a lubricating performance is decreased so that the head crash defect is easily caused to occur.

With the conventional lubricants described in the above-mentioned publications, these defects are frequently caused to occur. It is therefore difficult to satisfy a reliability required for recent magnetic disks. Thus, the magnetic disk is inhibited from an increase in capacity, an improvement in S/N ratio, and an increase in response speed.

SUMMARY OF THE INVENTION

In view of the above, it is an object of this invention to provide a method of producing a lubricant which provides a magnetic disk suitable for a LUL system and having a lubrication layer capable of suppressing a fly stiction defect or a contamination on a surface of a magnetic head even if the magnetic head has a very low flying height of 12 nm or less, a lubricant obtained by the method, a magnetic disk obtained by the use of the lubricant and having the above-mentioned feature, and a method of producing the magnetic disk.

In order to achieve the above-mentioned object, the present inventors conducted researches and studies. As a result, it has been found out that, depending upon a production lot of a fluoropolyether compound which is a component of a lubricant and which has a functional group as a terminal group, a fly stiction defect or a contamination of a magnetic head is caused to occur in a LUL durability test or a fly stiction test of a magnetic disk obtained by the use of the lubricant. The present inventors made further researches and studies about a cause of such unfavorable situation.

As a result, it has been revealed that the above-mentioned unfavorable situation is caused by a phosphorus-containing compound contained as an impurity in the fluoropolyether compound. Neither of the above-mentioned publications describes that the phosphorus-containing compound contained as an impurity in the lubricant has a serious influence upon the performance of the magnetic disk and proposes removal of such impurity.

As a result of still further researches and studies, the present inventors found out that the fly stiction defect and the contamination of the magnetic head can be suppressed by using a lubricant which is produced from a raw-material lubricant containing a phosphorus-containing compound by removing the phosphorus-containing compound from the raw-material lubricant by the use of, for example, a molecular sieve and which contains a phosphorus-containing compound at a content not greater than a particular value. Based on the finding, this invention has been completed.

Methods according to this invention and a lubricant according to this invention are as follows:

(1) A method of producing a lubricant for a magnetic disk including a lubrication layer, the lubricant being used in making the lubrication layer from the lubricant, the method comprising a removing step of removing, from a raw-material lubricant including a phosphorus-containing compound, the phosphorus-containing compound to produce the lubricant.

(2) The method according to the above-mentioned item (1), wherein the removing step produces the lubricant which includes the phosphorus-containing compound of 0.01 µg/g or less in terms of phosphate ions ($PO_4^{3-}$).

(3) The method according to the above-mentioned item (1), wherein the removing step is for removing, from the raw-material lubricant, the phosphorus-containing compound by bringing the raw-material lubricant into contact with a molecular sieve.

(4) The method according to the above-mentioned item (2), wherein the removing step is for removing, from the raw-material lubricant, the phosphorus-containing compound by bringing the raw-material lubricant into contact with a molecular sieve.

(5) The method according to the above-mentioned item (3), wherein the molecular sieve is crystalline zeolite having an effective pore size of 0.3 to 1.0 nm.

(6) The method according to the above-mentioned item (4), wherein the molecular sieve is crystalline zeolite having an effective pore size of 0.3 to 1.0 nm.

(7) The method according to the above-mentioned item (3), wherein the removing step is for removing, from the raw-material lubricant, the phosphorus-containing compound by bringing the raw-material lubricant into contact with a molecular sieve and, subsequently, subjecting the raw-material lubricant to molecular distillation.

(8) The method according to the above-mentioned item (4), wherein the removing step is for removing, from the raw-material lubricant, the phosphorus-containing compound by bringing the raw-material lubricant into contact with a molecular sieve and, subsequently, subjecting the raw-material lubricant to molecular distillation.

(9) The method according to the above-mentioned item (5), wherein the removing step is for removing, from the raw-material lubricant, the phosphorus-containing compound by bringing the raw-material lubricant into contact with a molecular sieve and, subsequently, subjecting the raw-material lubricant to molecular distillation.

(10) The method according to the above-mentioned item (6), wherein the removing step is for removing, from the raw-material lubricant, the phosphorus-containing compound by bringing the raw-material lubricant into contact with a molecular sieve and, subsequently, subjecting the raw-material lubricant to molecular distillation.

(11) The method according to the above-mentioned item (1), wherein the raw-material lubricant further includes a fluoropolyether compound having four hydroxyl groups in one molecule.

(12) The method according to the above-mentioned item (2), wherein the raw-material lubricant further includes a fluoropolyether compound having four hydroxyl groups in one molecule.

(13) The method according to the above-mentioned item (3), wherein the raw-material lubricant further includes a fluoropolyether compound having four hydroxyl groups in one molecule.

(14) The method according to the above-mentioned item (4), wherein the raw-material lubricant further includes a fluoropolyether compound having four hydroxyl groups in one molecule.

(15) The method according to the above-mentioned item (5), wherein the raw-material lubricant further includes a fluoropolyether compound having four hydroxyl groups in one molecule.

(16) The method according to the above-mentioned item (6), wherein the raw-material lubricant further includes a fluoropolyether compound having four hydroxyl groups in one molecule.

(17) The method according to the above-mentioned item (7), wherein the raw-material lubricant further includes a fluoropolyether compound having four hydroxyl groups in one molecule.

(18) The method according to the above-mentioned item (8), wherein the raw-material lubricant further includes a fluoropolyether compound having four hydroxyl groups in one molecule.

(19) The method according to the above-mentioned item (9), wherein the raw-material lubricant further includes a fluoropolyether compound having four hydroxyl groups in one molecule.

(20) The method according to the above-mentioned item (10), wherein the raw-material lubricant further includes a fluoropolyether compound having four hydroxyl groups in one molecule.

(21) A lubricant for a magnetic disk, which is obtained by the method according to the above-mentioned item (1).

(22) A magnetic disk comprising a substrate on which at least a magnetic layer, a protection layer, and a lubrication layer are successively formed, wherein the lubrication layer is made from the lubricant according to the above-mentioned item (21).

(23) The magnetic disk according to the above-mentioned item (22), which is mounted to a hard disk drive carrying out starting/stopping operations by a load unload system.

(24) A method of producing a magnetic disk comprising a substrate on which at least a magnetic layer, a protection layer, and a lubrication layer are successively formed, the method comprising the steps of forming a carbon-based protection layer as the protection layer and, subsequently, making the lubrication layer from the lubricant according to the above-mentioned item (21).

(25) The method according to the above-mentioned item (24), wherein the magnetic disk is adapted to be mounted to a hard disk drive carrying out starting/stopping operations by a load unload system.

According to this invention, it is possible to provide a method of producing a lubricant which provides a magnetic disk suitable for a LUL system and having a lubrication layer capable of suppressing a fly stiction defect or a contamination on a surface of a magnetic head even if the magnetic head has a very low flying height of 12 nm or less, and to provide a lubricant obtained by the method.

Further, it is possible to provide a magnetic disk obtained by the use of the above-mentioned lubricant and having the above-mentioned feature, and a method of producing the magnetic disk

DESCRIPTION OF THE PREFERRED EMBODIMENT

Figure 1:
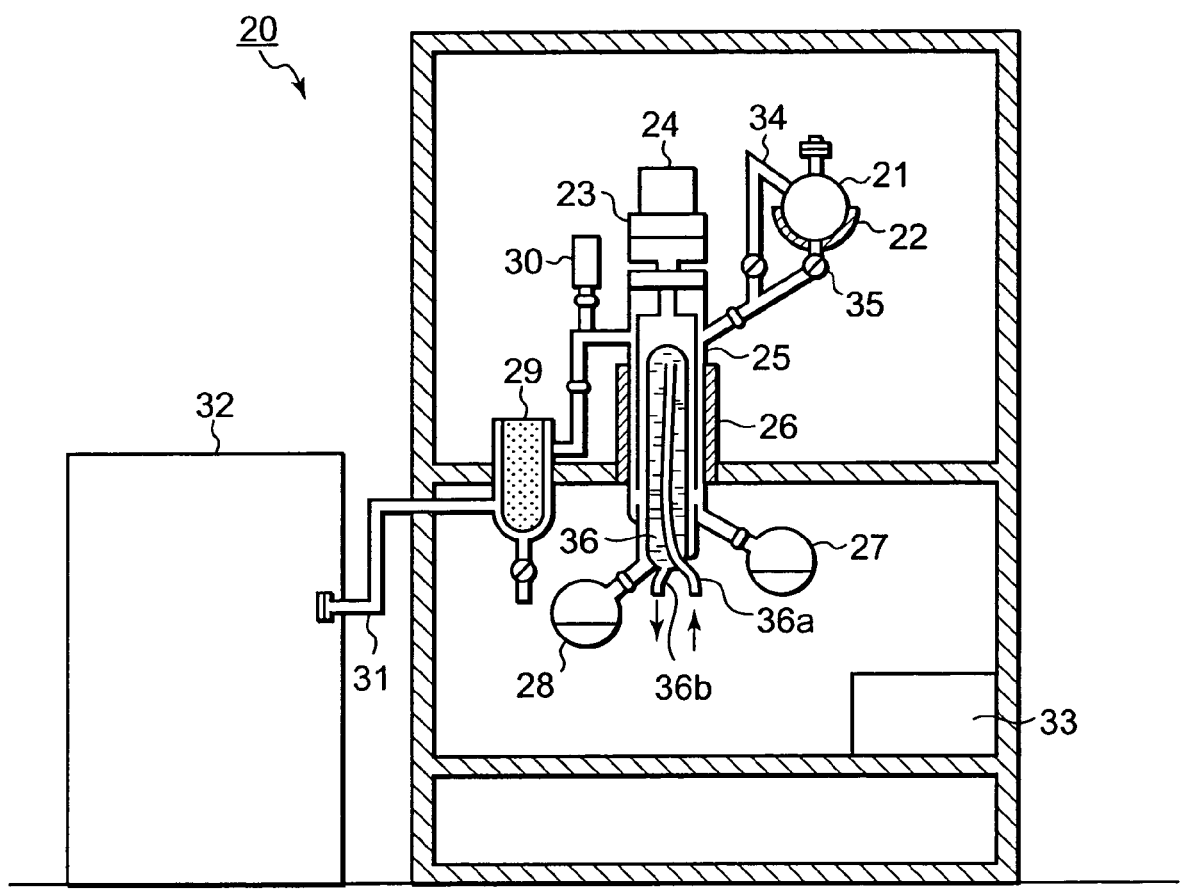
FIG. 1 shows an example of a molecular distillation apparatus which is used in the present invention.

At first, description will be made of a method of producing a lubricant for a magnetic disk.

The method of producing a lubricant for a magnetic disk to which this invention is applicable is for producing the lubricant for forming a lubrication layer formed on a surface of the magnetic disk. According to this invention, the lubricant is produced from a raw-material lubricant containing a phosphorus-containing compound by removing the phosphorus-containing compound from the raw-material lubricant.

The raw-material lubricant containing the phosphorus-containing compound to which this invention is applicable is not specifically limited as far as the phosphorus-containing compound is contained in the raw-material lubricant and the lubrication layer of the magnetic disk can be formed by the raw-material lubricant. Preferably, a fluoropolyether compound having a hydroxyl group as a terminal group is used as the raw-material lubricant. As the fluoropolyether compound having a hydroxyl group as a terminal group, use is preferably made of a fluoropolyether compound having two or more hydroxyl groups as terminal groups, for example, a compound having a structure represented by each of general formulas (I) and (II):

In the formulas, each of m, n, a, b, c, and d represents an integer not smaller than unity. In particular, in terms of the containability of the phosphorus-containing compound, it is preferable to apply the method of this invention to a fluoropolyether compound having four hydroxyl groups in one molecule as represented by the general formula (II).

The fluoropolyether compound having a hydroxyl group as a terminal group preferably has a weight-average molecular weight of 2000-8000, more preferably 3000-8000, further preferably 4000-8000 and has a molecular weight dispersion of 1.25 or less, more preferably 1.2 or less, further preferably 1.1 or less. The weight-average molecular weight smaller than 2000 is not preferable because a large amount of impurities may possibly be contained. On the other hand, the weight-average molecular weight greater than 8000 is not preferable because a viscosity is increased so that fly stiction may be caused. The molecular weight dispersion exceeding 1.25 is not preferable because molecular weight distribution becomes excessively wide and low-molecular-weight and high-molecular-weight components are contained. By adjusting the molecular weight distribution as mentioned above, it is possible to obtain a lubricant comprising a compound having a fluoropolyether main chain length (length of a main chain) providing a lubricating performance suitable for a magnetic disk. In particular, the lubricant containing the compound represented by the general formula (II) tends to contain a low-molecular-weight compound having a smaller number of terminal hydroxyl groups than that of the compound of the general formula (II) and also tends to contain impurities. However, by the molecular weight distribution in this invention, it is possible to eliminate the low-molecular-weight compound and the impurities and to suitably exhibit the effect of this invention.

In the compounds represented by the general formulas (I) and (II), each of m, n, a, b, c, and d is an integer not smaller than unity and is appropriately selected so that the compound have a weight-average molecular weight preferably between 2000 and 8000.

In this invention, a method of adjusting the molecular weight distribution (the weight-average molecular weight or the molecular weight dispersion) of the compounds represented by the general formulas (I) and (II) is not particularly limited as far as a molecular weight purification method capable of carrying out molecular weight fractionation is used. Preferably, however, the lubricant comprises a compound obtained by purification using supercritical extraction and/or molecular distillation. If molecular weight fractionation is carried out by the supercritical extraction and/or the molecular distillation, it is possible to suitably obtain the lubricant comprising the compound having the above-mentioned molecular weight distribution.

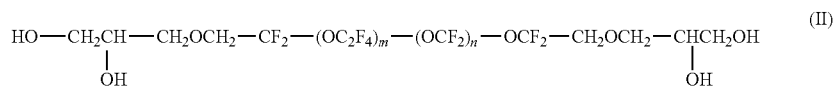

The phosphorus-containing compound contained in the above-mentioned fluoropolyether compound mainly comprises a compound producing phosphate ions ($PO_4^{3-}$).

In this invention, in order to remove the phosphorus-containing compound from the raw-material lubricant containing the phosphorus-containing compound, use is preferably made of a method of contacting the raw-material lubricant with a molecular sieve.

The molecular sieve is a crystalline zeolite comprising aluminosilicate, has slit-like micropores in crystals, and has a function that a crystal structure and an adsorption characteristic are variable depending upon a chemical composition.

In case where the phosphorus-containing compound in the raw-material lubricant is adsorbed and removed, molecules or ions in the phosphorus-containing compound which have a size not greater than an effective pore size of the molecular sieve are adsorbed by the molecular sieve. On the other hand, molecules or ions which have a size greater than the effective pore size are not adsorbed by the molecular sieve. The effective pore size of the molecular sieve used in this invention is appropriately selected depending upon the molecules or the ions in the phosphorus-containing compound which are to be adsorbed. Generally, the effective pore size preferably falls within a range between 0.3 and 1.0 nm. It is noted here that the phosphate ions ($PO_4^{3-}$) have a size of about 0.48 nm.

As the molecular sieve having an effective pore size within the range between 0.3 and 1.0 nm, use may be made of, for example, the type 3A (effective pore size of 0.3 nm), the type 4A (effective pore size of 0.4 nm), the type 5A (effective pore size of 0.5 nm), and the type 13X (effective pore size of 1.0 nm). The symbol A represents zeolite A while the symbol X represents zeolite X.

The method of contacting the raw-material lubricant with the molecular sieve is not particularly limited. For example, the following method may be used.

At first, the raw-material lubricant is diluted by an appropriate solvent, such as a fluorine-based solvent, to prepare a lubricant-containing solution to be processed which has a lubricant concentration on the order of 30-300 g/L. The concentration of the phosphorus-containing compound contained in the solution to be processed preferably falls within a range of 10-300 μg/g, particularly within a range of 15-150 μg/g. If the concentration of the phosphorus-containing compound contained in the solution to be processed is higher than 300 μg/g, the solution to be processed is preferably subjected to distillation or adsorption so that the concentration of the phosphorus-containing compound in the solution to be processed is adjusted to a level within the above-mentioned range.

Next, the molecular sieve is added to the lubricant-containing solution to be processed so that the content of the molecular sieve is on the order of 10-300 g/L, preferably 50-150 g/L. At a temperature within a range of 10-60° C., the solution is stirred for 0.1 to 5 hours to carry out an adsorption process of making the molecular sieve adsorb molecules or ions to be adsorbed, such as phosphate ions ($PO_4^{3-}$), which are contained in the phosphorus-containing compound. Thereafter, the solution after the adsorption process is subjected to microfiltration using a membrane filter or the like and then to distillation.

If the content of the phosphorus-containing compound is 0.1 μg/g or less in terms of the phosphate ions ($PO_4^{3-}$) as a result of the above-mentioned purification, the solution can be directly used as a lubricant for a magnetic disk. However, if it is desired to further decrease the content of the phosphorus-containing compound or if the content of the phosphorus-containing compound is greater than 0.1 μg/g in terms of the phosphate ions ($PO_4^{3-}$) as a result of the above-mentioned purification, molecular distillation is further carried out in order to reduce the content to 0.1 μg/g or less. Thus, the content of the phosphorus-containing compound can be decreased to a desired level in terms of the phosphate ions ($PO_4^{3-}$).

The molecular distillation is a process in which the lubricant purified by the molecular sieve as mentioned above is vaporized and distilled so that vaporized lubricant molecules are liquefied at a distance within an average free path thereof, i.e., so that a distance between a vaporization surface (evaporation surface) and a liquefaction surface (condensation surface) is kept within the average free path of the lubricant molecules (gas).

The above-mentioned molecular distillation provides a high distillation efficiency because the vaporized lubricant molecules hardly return to the vaporization surface due to molecular collision. Thus, by the molecular distillation, the vaporized lubricant molecules are liquefied at a distance within the average free path without colliding with other molecules. Accordingly, distillation can be carried out in a nonequilibrium condition towards the liquefaction surface (a condition where the vaporized lubricant particles are out of equilibrium towards a liquefaction direction).

Next, description will be made of an apparatus for carrying out the above-mentioned molecular distillation.

FIG. 1 shows a structure of a molecular distillation apparatus. The molecular distillation apparatus depicted at 20 in the figure comprises a feed flask 21, a feed flask mantle heater 22, a magnetic coupling stirrer 23, a stirrer control box 24, a distillation main pipe 25, a distillation main pipe mantle heater 26, a residue receiver flask 27, a distillate receiver flask 28, a low-boiling-point substance condenser trap 29, a vacuum gauge 30, and an evacuating unit 32. A pipe 31 is connected to the evacuating unit 32. The apparatus as a whole is controlled by a control panel 33.

The lubricant to be subjected to molecular distillation is supplied into the feed flask 21. The molecular distillation is not necessarily carried out in a reduced pressure environment. However, in case where the lubricant for a magnetic disk contains a high-molecular-weight component, the molecular distillation is preferably carried out in a predetermined reduced pressure environment. Unless the molecular distribution is carried out in the reduced pressure environment, the vaporized lubricant molecules collide with other molecules with an increased frequency to be prevented from being liquefied at a distance within the average free path.

Therefore, after the lubricant is supplied into the feed flask 21, the interior of the apparatus is evacuated by the evacuating unit 32 to a predetermined reduced pressure level. For example, the reduced pressure level is preferably on the order of $1 \times 10^{-2}$ Pa to $1 \times 10^{-3}$ Pa or a higher vacuum below this range. The reduced pressure level can be monitored by the vacuum gauge 30. Impurity gas and the like contained in the lubricant flow through the pipe 34 towards the evacuating unit 32 and are partly collected in the low-boiling-point substance condenser trap 29. If necessary, the lubricant in the feed flask 21 is heated by the feed flask mantle heater 22.

After the interior of the apparatus is evacuated into the predetermined reduced pressure level (vacuum), the lubricant is fed from the feed flask 21 into the distillation main pipe 25. The amount of the lubricant (feeding amount) supplied from the feed flask 21 into the distillation main pipe 25 can be controlled by an opening degree of a cock 35 attached to a lower end of the feed flask 21. Generally, the feeding amount of 1-30 g/min is appropriate. If the feeding amount is too small, the distillation requires a long time. On the other hand, if the feeding amount is too great, the distillation efficiency may possibly be decreased.

The lubricant flowing into the distillation main pipe 25 is heated to a predetermined temperature by the distillation main pipe mantle heater 26 arranged around the distillation main pipe 25 of a cylindrical shape. Herein, the heating temperature is at least a temperature at which the lubricant is vaporized, and is different depending upon the type of the lubricant. In case of the lubricant containing the fluoropolyether compound as a main component, the heating temperature preferably falls within a range between 100 and 200° C., particularly within a range between 160 to 200° C. The heating temperature of the lubricant can be controlled by controlling the temperature of the mantle heater 26. If a thermometer is disposed in the distillation main pipe 25, it is possible to measure an actual heating temperature of the lubricant in the distillation main pipe 25.

The magnetic coupling stirrer 23 has a wiper, for example, made of fluorine resin and disposed in the distillation main pipe 25 in a longitudinal direction thereof. Under control of the stirrer control box 24, the wiper is rotated in a predetermined direction at a rotation speed of 20 to 100 rpm. By the rotation of the wiper, the lubricant is spread as a thin film along a wall surface of the distillation main pipe 25 so as to be easily vaporized. The vaporized lubricant is contacted with a cooling rod 36 disposed in the distillation main pipe 25 to be liquefied and collected in the distillate receiver flask 28. A cooling water is introduced into the cooling rod 36 through an inlet port 36a at its lower end and is discharged through a discharge port 36b. A residue collected in the residue receiver flask 27 without being vaporized may be supplied again into the feed flask 21 to be repeatedly distilled after changing the heating temperature by the distillation main pipe mantle heater 26.

The molecular distillation apparatus shown in FIG. 1 is no more than a mere example. An apparatus for molecular distillation is not limited thereto.

This invention also provides a lubricant for a magnetic disk which is obtained by the above-mentioned method, and a magnetic disk having a lubrication layer deposited by the use of the above-mentioned lubricant for a magnetic disk.

In the lubricant for a magnetic disk according to this invention, the content of the phosphorus-containing compound is generally 0.1 µg/g or less, preferably 0.05 µg/g or less in terms of phosphate ions ($PO_4^{3-}$). The magnetic disk according to this invention has a lubrication layer capable of suppressing a fly stiction defect and a contamination on a surface of a magnetic head even if the magnetic head has a very low flying height of 12 nm or less, and is suitably mounted to a hard disk drive in which starting and stopping operations are carried out by the LUL system.

Further, this invention also provides a method of producing a magnetic disk which is for producing the magnetic disk comprising a substrate with at least a magnetic layer, a protection layer, and a lubrication layer successively formed thereon and which comprises the steps of depositing a carbon-based protection layer as the protection layer and then depositing the above-mentioned lubricant for a magnetic disk as the lubrication layer.

In this invention, the lubrication layer is deposited using, as a lubricant, a lubricant for a magnetic disk which is produced from a raw-material lubricant containing a phosphorus-containing compound by removing the phosphorus-containing compound from the raw-material lubricant. Preferably, use is made of a lubricant in which the content of the phosphorus-containing compound is 0.1 µg/g or less, preferably 0.05 µg/g or less in terms of phosphate ions ($PO_4^{3-}$) and which contains a fluoropolyether compound having two or more hydroxyl groups as terminal groups, particularly, a fluoropolyether compound having four hydroxyl groups in one molecule.

In this invention, a method of depositing the lubrication layer is not particularly limited. For example, use may be made of dip coating, spin coating, spraying, and vapor coating. In this invention, in case where the lubrication layer is deposited by the use of a solution obtained by dispersing and dissolving the lubricant in a solvent, the solvent is appropriately selected as far as the lubricant is suitably dissolved. If the lubricant is the fluoropolyether compound mentioned above, a fluorine-based solvent is preferable because the lubricant is suitably dispersed and dissolved. As the fluorine-based solvent, Vertrel™ XF manufactured by DuPont-Mitsui Fluorochemical or HFE7100 manufactured by 3M is suitably used.

In this invention, the lubrication layer preferably has a thickness within a range between 0.5 and 1.8 nm, particularly within a range between 0.7 and 1.5 nm. The thickness smaller than 0.5 nm is not preferable because the lubricating performance of the lubrication layer is degraded. The thickness exceeding 1.8 nm is not preferable because an upper region of the lubrication layer may have a part weakened in adhesive strength with the protection layer.

If necessary, the lubrication layer may appropriately contain an additive or additives selected from various kinds of additives generally known as additives for a lubrication layer of a magnetic disk, for example, a deterioration inhibitor for a fluoropolyether-based lubricant, as far as the object of this invention is not impaired.

In this invention, the magnetic disk is preferably subjected to heat treatment after the lubrication layer is deposited. This is because the heat treatment improves contact between the lubrication layer and the protection layer and improves an adhesive strength. A heat treatment temperature preferably falls within a range between 100 and 180° C. The heat treatment temperature lower than 100° C. is not preferable because the contact between the layers is insufficient. On the other hand, the heat treatment temperature higher than 180° C. is not preferable because the lubricant may be thermally decomposed. A heat treatment time is preferably between 30 and 120 minutes.

In this invention, the protection layer is preferably a carbon-based protection layer. The carbon-based protection layer is suitable because this layer has a high affinity with a terminal functional group having a hydroxyl group so that the lubrication layer is improved in adhesion to the protection layer. As the carbon-based protection layer, a hydrogenated carbon protection layer, a carbon nitride protection layer, a hydrogenated carbon nitride protection layer, or the like is preferable. The protection layer preferably has a thickness between 3 and 8 nm. If the thickness is smaller than 3 nm, a function as the protection layer is insufficient so that a head crash defect is possibly caused to occur. The thickness greater than 8 nm is not preferable in view of an improvement in S/N because a distance between the magnetic layer and a magnetic head is excessively long. The protection layer is preferably deposited by plasma CVD.

In this invention, a glass substrate is preferably used as the substrate. The glass substrate is excellent in flatness and smoothness and is therefore suitable for an increase in recording density. As the glass substrate, an aluminosilicate glass substrate is preferable.

In this invention, a principal surface of the substrate preferably has a surface roughness of 6 nm or less in Rmax and 0.6 nm or less in Ra. With such a flat and smooth substrate, the flying height of the magnetic head can be lowered to 12 nm or less but there is a problem that the lubrication layer easily migrates because the surface is very flat and smooth. However, this invention is capable of suppressing migration of the lubrication layer and is therefore very advantageous. Rmax and Ra herein referred to are based on the definition in JIS (Japanese Industrial Standard) B0601 and are also disclosed in U.S. Pat. No. 6,544,893.

In this invention, the magnetic layer is not particularly limited. The magnetic layer may be a recording layer for an in-plane recording system or a recording layer for a perpendicular recording system. A CoPt-based magnetic layer is suitable because high coercive force and high reproduction output are achieved.

In the magnetic disk of this invention, an underlayer may be formed between the substrate and the magnetic layer if necessary. Further, a seed layer may be formed between the underlayer and the substrate. As the under layer, a Cr layer, a Cr-based alloy layer such as CrMo, CrW, CrV, and CrTi, or the like may be used. As the seed layer, an NiAl alloy layer, an AlRu alloy layer, or the like may be used.

EXAMPLES

Next, this invention will be described more in detail in connection with specific examples. It should be noted that this invention is not limited to these examples.

The performance of the magnetic disk was evaluated by the following methods.

(1) LUL Durability Test

The LUL test is carried out by the use of a 2.5 inch (65 mm) magnetic disk apparatus rotating at 5400 rpm and a magnetic head having a flying height of 12 nm. The magnetic head has a NPAB slider (negative pressure air bearing slider) as a slider and a GMR (giant magnetoresistive) device as a reproducing device. A shielding portion is made of an NiFe alloy. The magnetic disk is mounted to the magnetic disk apparatus and subjected to a LUL operation by the magnetic head. Thus, the number of times of the LUL operation performed without trouble is measured.

After the LUL durability test, a surface of the magnetic disk and a surface of the magnetic head are observed by both human eyes and an optical microscope to confirm presence or absence of an abnormal condition such as damage or contamination. In the LUL durability test, it is required to endure or withstand the LUL operation of 400,000 times or more without any trouble, more preferably, 600,000 times or more. In a normal working environment of a HDD (hard disk drive), the LUL operation of 600,000 times generally requires the use for about 10 years.

(2) Fly Stiction Test

For 100 magnetic disks, a glide test is carried out by the use of a glide head having a flying height of 6 nm to examine whether or not fly stiction is caused to occur. Upon occurrence of the fly stiction, a flying position of the glide head suddenly becomes abnormal. Therefore, by monitoring a signal of a piezoelectric device attached to the glide head, it is possible to detect occurrence of the fly stiction.

In order to analyze phosphate ions in the lubricant, suppressed ion chromatography is used. 1 g of the lubricant is extracted into water and subjected to concentration measurement. As an eluent, a solution of a mixture of $Na_2CO_3$ and $NaHCO_3$ is used. As a separation column, "AS12A" manufactured by Dionex is used. In order to detect ions, use is made of an electric conductivity detector having high sensitivity and high-speed response.

Example 1

(1) Production of a Lubricant for a Magnetic Disk (a) First Purifying Step

As a raw-material lubricant, a lubricant "Fomblin Z-tetraol™" (trade name) manufactured by Solvay Solexis was used. By ion chromatography, it was confirmed that the raw-material lubricant contained 0.47 μg/g of a phosphorus-containing substance in terms of phosphate ions ($PO_4^{3-}$).

The raw-material lubricant was dispersed and dissolved in a solvent "Vertrel™ XP" (trade name) manufactured by Dupont-Mitsui Fluorochemical so that the concentration was equal to 100 g/L. Thus, a material solution was prepared.

Next, into 1L of the material solution, 100 g of "Molecular Sieve 5A 1/16" (trade name) (manufactured by Kanto Chemical and having an effective pore size of 0.5 nm was supplied. Thereafter, the solution was stirred by a rotary evaporator at 25° C. for one hour without reducing a pressure. Thus, purification was performed to remove impurities (phosphorus-containing substance) contained in the raw-material lubricant.

Then, the solution purified as mentioned above was filtered by a membrane filter having a pore size of 0.45 μm to remove the molecular sieve. Thereafter, the solution was filtered by another membrane filter having a pore size of 0.1 μm to be subjected to microfiltration. Thus, the molecular sieve and particles were completely removed from the solution.

Thereafter, reduced-pressure distillation was carried out by the use of the rotary evaporator to separate the solvent from the solution. Thus, a purified lubricant was produced.

(b) Second Purifying Step

The purified lubricant obtained by the first purifying step (a) was supplied into a feed flask of a molecular distillation apparatus. By an evacuating unit, the interior of the molecular distillation apparatus was pressure-reduced to $1 \times 10^{-3}$ Pa. A distillation main pipe mantle heater was set at 200° C. By utilizing a reduced-pressure environment in the molecular distillation apparatus, impurity gas and the like contained in the lubricant in the feed flask were expelled.

Then, the lubricant was supplied from the feed flask into the distillation main pipe at a constant speed. In this event, a wiper was driven at a predetermined rotation speed. By carrying out molecular distillation as mentioned above, a lubricant for a magnetic disk was produced as a distillate fraction at 200° C.

According to ion chromatography, the lubricant for a magnetic disk contained 0.01 μg/g of the phosphorus-containing substance in terms of phosphate ions ($PO_4^{3-}$).

(2) Production of Magnetic Disk

Figure 2:
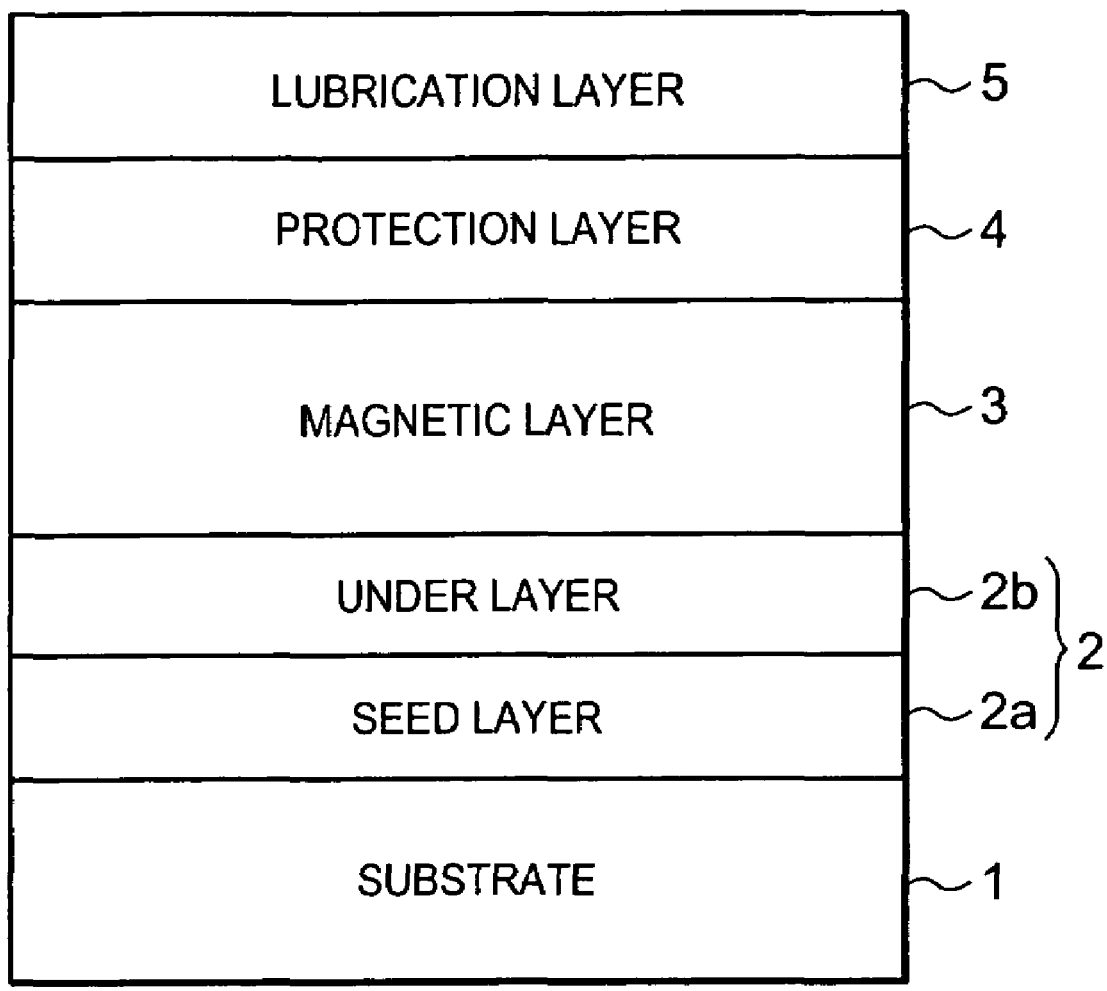
FIG. 2 is a schematic sectional view of a magnetic disk for use in describing the present invention.

Referring to FIG. 2, on a glass substrate 1, a seed layer 2a, an underlayer 2b, and a magnetic layer 3 were successively deposited by DC magnetron sputtering in an Ar gas atmosphere. The seed layer 2a and the underlayer 2b constitute a metal layer 2. The seed layer 2a serves to promote miniaturization of crystal grains. In this example, an AlRu alloy was used as the seed layer 2a. The underlayer 2b serves to promote magnetic orientation of the magnetic layer 3. In this example, a CrW alloy was used as the underlayer 2b. The magnetic layer 3 is a magnetic recording layer comprising a ferromagnetic material. In this example, a CoCrPtB alloy was used as the magnetic layer 3. Subsequently, a carbon-based protection layer was deposited as a protection layer 4 on the magnetic layer 3 by plasma CVD (Chemical Vapor Deposition) using an acetylene gas as a material gas. The carbon-based protection layer thus deposited was an amorphous hydrogenated carbon protection layer. The protection layer 4 had a thickness of 5 nm.

Next, preparation was made of a solution in which the lubricant for a magnetic disk produced in the above-mentioned process (1) was dispersed and dissolved in a fluorine-based solvent Vertrel™ XF manufactured by DuPont-Mitsui Fluorochemical so that the concentration was 0.02 mass %.

Using the above-mentioned solution as a coating solution, the magnetic disk with the protection layer 4 deposited at its top was dipped therein. Thus, a lubrication layer 5 was applied and deposited by dipping. The lubrication layer 5 had a thickness of 1 nm. Then, the magnetic disk was heat treated in a vacuum furnace at 130° C. for 90 minutes. Thus, a 2.5 inch (65 mm) magnetic disk was produced.

(3) Test of Magnetic Disk

The magnetic disk produced in the above-mentioned process (2) was subjected to the LUL durability test and the fly stiction test.

As a result of the LUL durabiility test, the magnetic disk endured after the LUL operation of 900,000 times without trouble. After the LUL durability test, the surface of the magnetic disk was visually observed. As a result, no abnormal condition such as damage or contamination was observed. Further, adhesion of the lubricant or corrosion was not observed. Thus, the magnetic disk has an excellent surface condition.

As a result of the fly stiction test, no fly stiction was caused to occur. The pass rate of the test was 100%.

After the LUL durability test, the amount of contamination adhered to the magnetic head was measured in the following manner. The amount was 0.66 point.

Measurement of Amount of Contamination Adhered to Magnetic Head

The contamination adhered to the magnetic head was measured by observing a NPAB slider portion and a reproducing device portion of the magnetic head after the durability test using an optical microscope and an electron microscope. For example, if the lubricant or the like migrated from the magnetic disk to the magnetic head, the lubricant or the like was observed as contamination. Corrosion of the magnetic head was also observed as contamination.

The amount of contamination was evaluated in the following manner. A reference amount of contamination was preliminarily determined as a reference point (point value of 1.00). The amount of contamination was evaluated relative to the reference point. According to the experience of the present inventors, it has been found out that the amount of contamination exceeding 1.00 point causes easy occurrence of failure of the hard disk drive.

Table 1 shows the results of the LUL durability test and the fly stiction test.

Example 2

A 2.5 inch (65 mm) magnetic disk was produced in the manner similar to Example 1 except that "Molecular Sieve 5A 1/16" was replaced by "Molecular Sieve 4A 1/16" (trade name) manufactured by Kanto Chemical and having an effective pore size of 0.4 nm.

The magnetic disk was subjected to the LUL durability test and the fly stiction test.

As a result of the LUL durability test, the magnetic disk endured after the LUL operation of 900,000 times without trouble. After the LUL durability test, the surface of the magnetic disk was visually observed. As a result, no abnormal condition such as damage or contamination was observed. Further, adhesion of the lubricant or corrosion was not observed. Thus, the magnetic disk had an excellent surface condition.

As a result of the fly stiction test, no fly stiction was caused to occur. The pass rate of the test was 100%.

The results of the LUL durability test and the fly stiction test are shown in Table 1.

Example 3

A lubricant for a magnetic disk was produced in the manner similar to Example 1 except that purification was carried out by the use of "Molecular Sieve 5A 1/16" without performing the molecular distillation. Further, a 2.5 inch (65 mm) magnetic disk was produced.

According to ion chromatography, the lubricant for a magnetic disk contained 0.04 μg/g of the phosphorus-containing substance in terms of phosphate ions ($PO_4^{3-}$).

The magnetic disk was subjected to the LUL durability test and the fly stiction test.

As a result of the LUL durabiility test, the magnetic disk endured after the LUL operation of 700,000 times without trouble. After the LUL durability test, the surface of the magnetic disk was visually observed. As a result, no abnormal condition such as damage or contamination was observed. Further, adhesion of the lubricant or corrosion was not observed. Thus, the magnetic disk had an excellent surface condition As a result of the fly stiction test, no fly stiction was caused to occur. The pass rate of the test was 100%.

After the LUL durability test, the amount of contamination adhered to the magnetic head was measured in the manner similar to Example 1. As a result, the amount of contamination was 0.60 point.

The results of the LUL durability test and the fly stiction test are shown in Table 1.

Comparative Example 1

A 2.5 inch (65 mm) magnetic disk was produced in the manner similar to Example 1 except that "Fomblin Z-tetraol™" (mentioned above) was directly used as a lubricant for a magnetic disk.

The magnetic disk was subjected to the LUL durability test and the fly stiction test.

As a result of the LUL durability test, trouble occurred after the LUL operation of 300,000 times. On the surface of the magnetic disk and the surface of the magnetic head, head crash damage was observed. As a result of the fly stiction test, crash occurred and the pass rate of the test was 50%.

After the LUL durability test, the amount of contamination adhered to the magnetic head was measured in the manner similar to Example 1. As a result, the amount of contamination was 4.00 points. The contamination adhered to the magnetic head was analyzed by XPS (X-ray photoelectron spectroscopy). As a result, presence of a phosphorus element was detected.

The results of the LUL durability test and the fly stiction test are shown in Table 1.

TABLE 1

|  | LUL Durability Test | | | Fly Stiction Test | |
| --- | --- | --- | --- | --- | --- |
|  | Number of Times | Disk Surface | Head Surface | Pass Rate | Fly Stiction |
| Example 1 | endured 900,000 times | good | good | 100% | no |

TABLE 1-continued

| | LUL Durability Test | | | Fly Stiction Test | |
|---|---|---|---|---|---|
| | Number of Times | Disk Surface | Head Surface | Pass Rate | Fly Stiction |
| Example 2 | endured 900,000 times | good | good | 100% | no |
| Example 3 | endured 700,000 times | good | good | 100% | no |
| Comparative Example | failed at 300,000 times | head crash damage | head crash damage | 100% | crash occurred |

Reference Example 1

A lubricant for a magnetic disk was produced in the manner similar to Example 1 except that only molecular distillation of "Fomblin Z-tetraol™" as a raw-material lubricant was performed.

According to ion chromatography, the lubricant for a magnetic disk contained 0.20 μg/g of the phosphorus-containing substance in terms of phosphate ions ($PO_4^{3-}$).

The lubricant for a magnetic disk which is obtained by the method of this invention can provide a magnetic disk which is suitable for the LUL system and which has a lubrication layer capable of suppressing the fly stiction defect and the contamination on the surface of the magnetic head even if the magnetic head has a very low flying height of 12 nm or less.

While this invention has thus far been disclosed in conjunction with the preferred embodiment and the specific examples thereof, it will be readily possible for those skilled in the art to put this invention into practice in various other manners.

What is claimed is:

1. A method of producing a lubricant for a magnetic disk including a lubrication layer, said lubricant being used in making said lubrication layer from said lubricant, said method comprising a removing step of removing, from a raw-material lubricant including a phosphorus-containing compound, said phosphorus-containing compound to produce said lubricant,
   wherein said removing step is for removing, from said raw-material lubricant, said phosphorus-containing compound by bringing said raw-material lubricant into contact with a molecular sieve, and
   wherein said molecular sieve is crystalline zeolite having an effective pore size of 0.3 to 1.0 nm.

2. The method according to claim 1, wherein said removing step produces said lubricant which includes the phosphorus-containing compound of 0.01 μg/g or less in terms of phosphate ions ($PO_4^{3-}$).

3. The method according to claim 1, wherein said removing step is for removing, from said raw-material lubricant, said phosphorus-containing compound by bringing said raw-material lubricant into contact with a molecular sieve and, subsequently, subjecting said raw-material lubricant to molecular distillation.

4. The method according to claim 2, wherein said removing step is for removing, from said raw-material lubricant, said phosphorus-containing compound by bringing said raw-material lubricant into contact with a molecular sieve and, subsequently, subjecting said raw-material lubricant to molecular distillation.

5. A method of producing a lubricant for a magnetic disk including a lubrication layer, said lubricant being used in making said lubrication layer from said lubricant, said method comprising a removing step of removing, from a raw-material lubricant including a phosphorus-containing compound, said phosphorus-containing compound to produce said lubricant,
   wherein said removing step is for removing, from said raw-material lubricant, said phosphorus-containing compound by bringing said raw-material lubricant into contact with a molecular sieve, and
   wherein said raw-material lubricant further includes a fluoropolyether compound having four hydroxyl groups in one molecule.

6. A method of producing a lubricant for a magnetic disk including a lubrication layer, said lubricant being used in making said lubrication layer from said lubricant, said method comprising a removing step of removing, from a raw-material lubricant including a phosphorus-containing compound, said phosphorus-containing compound to produce said lubricant,
   wherein said removing step is for removing, from said raw-material lubricant, said phosphorus-containing compound by bringing said raw-material lubricant into contact with a molecular sieve,
   wherein said molecular sieve is crystalline zeolite having an effective pore size of 0.3 to 1.0 nm, and
   wherein said raw-material lubricant further includes a fluoropolyether compound having four hydroxyl groups in one molecule.

7. A method of producing a lubricant for a magnetic disk including a lubrication layer, said lubricant being used in making said lubrication layer from said lubricant, said method comprising a removing step of removing, from a raw-material lubricant including a phosphorus-containing compound, said phosphorus-containing compound to produce said lubricant,
   wherein said removing step is for removing, from said raw-material lubricant, said phosphorus-containing compound by bringing said raw-material lubricant into contact with a molecular sieve and, subsequently, subjecting said raw-material lubricant to molecular distillation, and
   wherein said raw-material lubricant further includes a fluoropolyether compound having four hydroxyl groups in one molecule.

8. A method of producing a lubricant for a magnetic disk including a lubrication layer, said lubricant being used in making said lubrication layer from said lubricant, said method comprising a removing step of removing, from a raw-material lubricant including a phosphorus-containing compound, said phosphorus-containing compound to produce said lubricant,
   wherein said removing step is for removing, from said raw-material lubricant, said phosphorus-containing compound by bringing said raw-material lubricant into contact with a molecular sieve and, subsequently, subjecting said raw-material lubricant to molecular distillation,
   wherein said molecular sieve is crystalline zeolite having an effective pore size of 0.3 to 1.0 nm, and wherein said raw-material lubricant further includes a fluoropolyether compound having four hydroxyl groups in one molecule.

9. The method according to claim 5, wherein said removing step produces said lubricant which includes the phosphorus-containing compound of 0.01 μg/g or less in terms of phosphate ions ($PO_4^{3-}$).

10. The method according to claim 6, wherein said removing step produces said lubricant which includes the phosphorus-containing compound of 0.01 μg/g or less in terms of phosphate ions ($PO_4^{3-}$).

11. The method according to claim 7, wherein said removing step produces said lubricant which includes the phosphorus-containing compound of 0.01 μg/g or less in terms of phosphate ions ($PO_4^{3-}$).

12. The method according to claim 8, wherein said removing step produces said lubricant which includes the phosphorus-containing compound of 0.01 μg/g or less in terms of phosphate ions ($PO_4^{3-}$).

* * * * *